(12) United States Patent
Arai (10) Patent No.: US 6,169,844 B1
(45) Date of Patent: Jan. 2, 2001

(54) PROGRAM RECORDING METHODS AND APPARATUS

(75) Inventor: Masayuki Arai, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/003,027

(22) Filed: Jan. 5, 1998

(30) Foreign Application Priority Data

Jan. 6, 1997 (JP) .................................................. 9-000004

(51) Int. Cl.[7] .................................................. H04N 5/92
(52) U.S. Cl. .................................................. 386/83; 386/112
(58) Field of Search .................................. 386/46, 67, 109, 386/112, 92, 83, 95; 360/32, 48; 369/32; H04N 5/92

(56) References Cited

U.S. PATENT DOCUMENTS

| | | | |
|---|---|---|---|
| 5,065,259 | * 11/1991 | Kubota et al. | 386/7 |
| 5,187,589 | * 2/1993 | Kono et al. | 386/83 |
| 5,335,116 | * 8/1994 | Onishi et al. | 386/67 |
| 5,381,275 | * 1/1995 | Nitta et al. | 386/112 |
| 5,594,598 | * 1/1997 | Shikakura | 386/109 |

* cited by examiner

*Primary Examiner*—Huy Nguyen
(74) *Attorney, Agent, or Firm*—Limbach & Limbach L.L.P.; Seong-Kun Oh (57) ABSTRACT

When input signals for a plurality of programs, after being subjected to data compression, are to be multiplexed and recorded, switching of data compression ratios are controlled for each input signal according to the data transfer rate at which recording is possible and the unused capacity on the recording medium among other factors. In this manner, a program recording apparatus is enabled to simultaneously record a plurality of programs simply and reliably by applying this disposition to, for instance, an optical disk apparatus for recording television broadcast programs.

27 Claims, 8 Drawing Sheets

|  | COMBINATION A | COMBINATION B | COMBINATION C | COMBINATION D |
|---|---|---|---|---|
| PROGRAM 1 | LP1 | LP2 | LP2 | LP2 |
| PROGRAM 2 | LP2 | LP1 | LP2 | LP2 |
| PROGRAM 3 | LP2 | LP2 | LP1 | LP2 |
| CAPACITY [GB] | 2.7 | 2.25 | 2.25 | 1.8 |

PROGRAM RECORDING METHODS AND APPARATUS

BACKGROUND OF THE INVENTION

1. Field of the Invention

The present invention relates to a program recording apparatus which is applicable, for example, to an optical disk apparatus for recording television broadcast programs. More particularly, the invention makes possible simultaneous recording of a plurality of programs in a simple and reliable manner by controlling the switching of data compression ratios of a plurality of sequences of input signals.

2. Description of the Prior Art

Television broadcasting is accomplished over many broadcast channels conveying a variety of programs to the viewers, each of whom may record such television broadcasts with a video cassette recorder so that he or she can watch the recorded programs some time after they are on the air.

In television broadcasting, however, a plurality of programs the viewer may wish to watch may be broadcast during the same hour or hours.

In such a case, it would be convenient for the viewer if the plurality of programs can be recorded with one recording apparatus. Conceivably, the plurality of programs can be recorded simultaneously by digitizing the received plurality of sequences of video and audio signals and multiplexing the digital signals.

However, if a plurality of programs are simply recorded at the same time, the data used for the recording will correspondingly increase to so enormous a volume that it may become impossible to record the plurality of programs completely, depending on the number of programs to be recorded and the duration of each.

SUMMARY OF THE INVENTION

The present invention has been attempted in view of this problem, and is intended to propose a program recording apparatus capable of simultaneous recording of a plurality of programs in a simple and reliable manner.

In order to solve this problem, a program recording apparatus according to the invention is provided with data compressing means to supply input signals for a plurality of programs at a prescribed compression ratio for each program, multiplexing means for multiplexing the output data of these data compressing means, data recording means for recording the output data of the multiplexing means on a prescribed recording medium, and control means for controlling the switching of the respective data compression ratios of the data compressing means.

If, after the input signals for the plurality of programs are compressed at respectively prescribed compression ratios, they are multiplexed by the multiplexing means and the multiplexed signals are recorded on the prescribed recording medium, the plurality of programs can be recorded simultaneously. If, in this process, the control means controls the data compression ratios of the data compressing means, the plurality of desired programs can be reliably recorded as the data compression ratios are switched according to the transfer rate at which recording is possible and the unused capacity of the recording medium among other factors.

DESCRIPTION OF THE PREFERRED EMBODIMENTS

Preferred embodiments of the invention will be described in detail below with reference to the drawings as appropriate.

Figures 2, 2B:
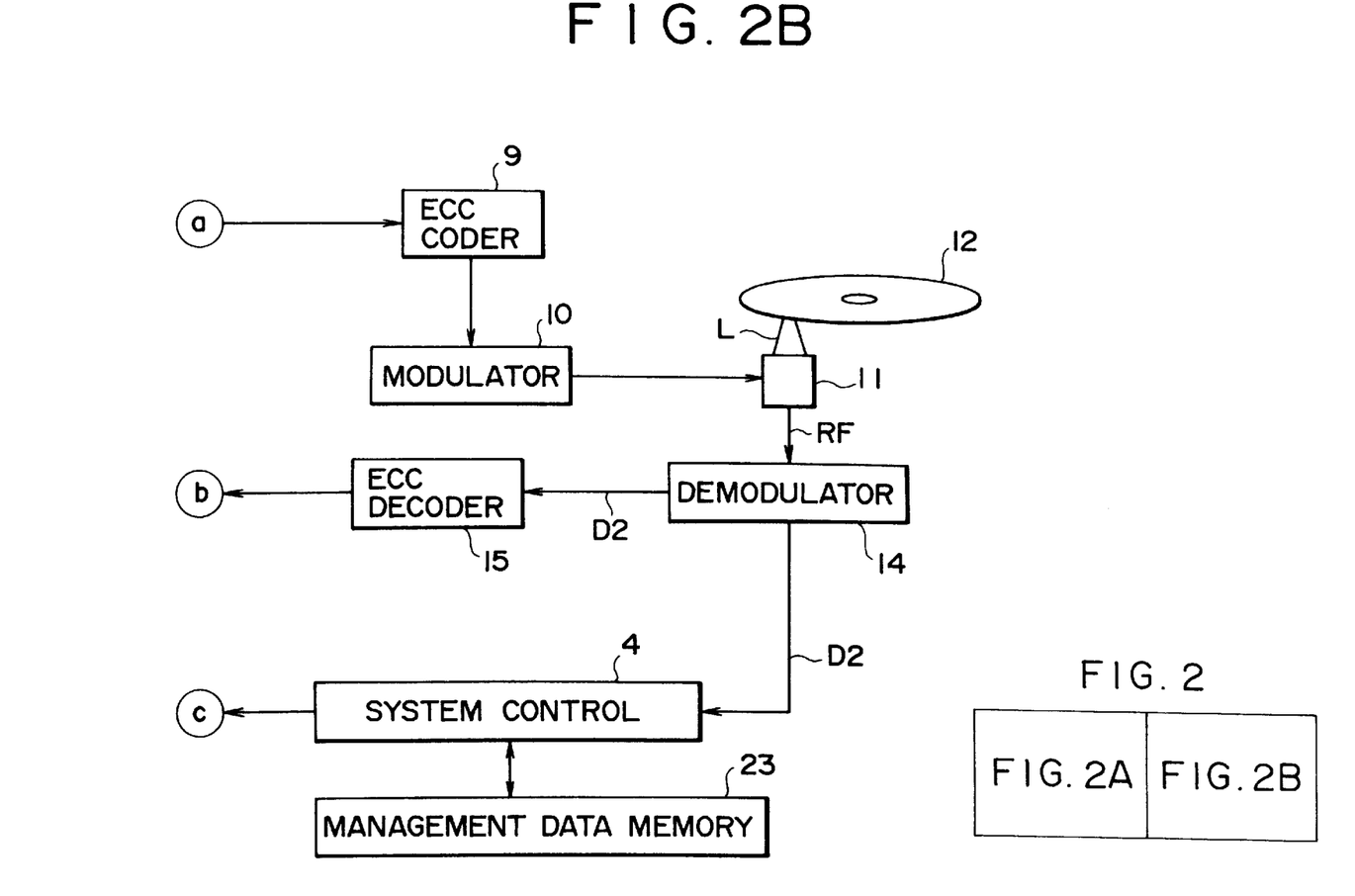
FIGS. 2A and 2B are blocking diagrams illustrating the optical disk apparatus referred to in FIG. 1.
Figure 2A:
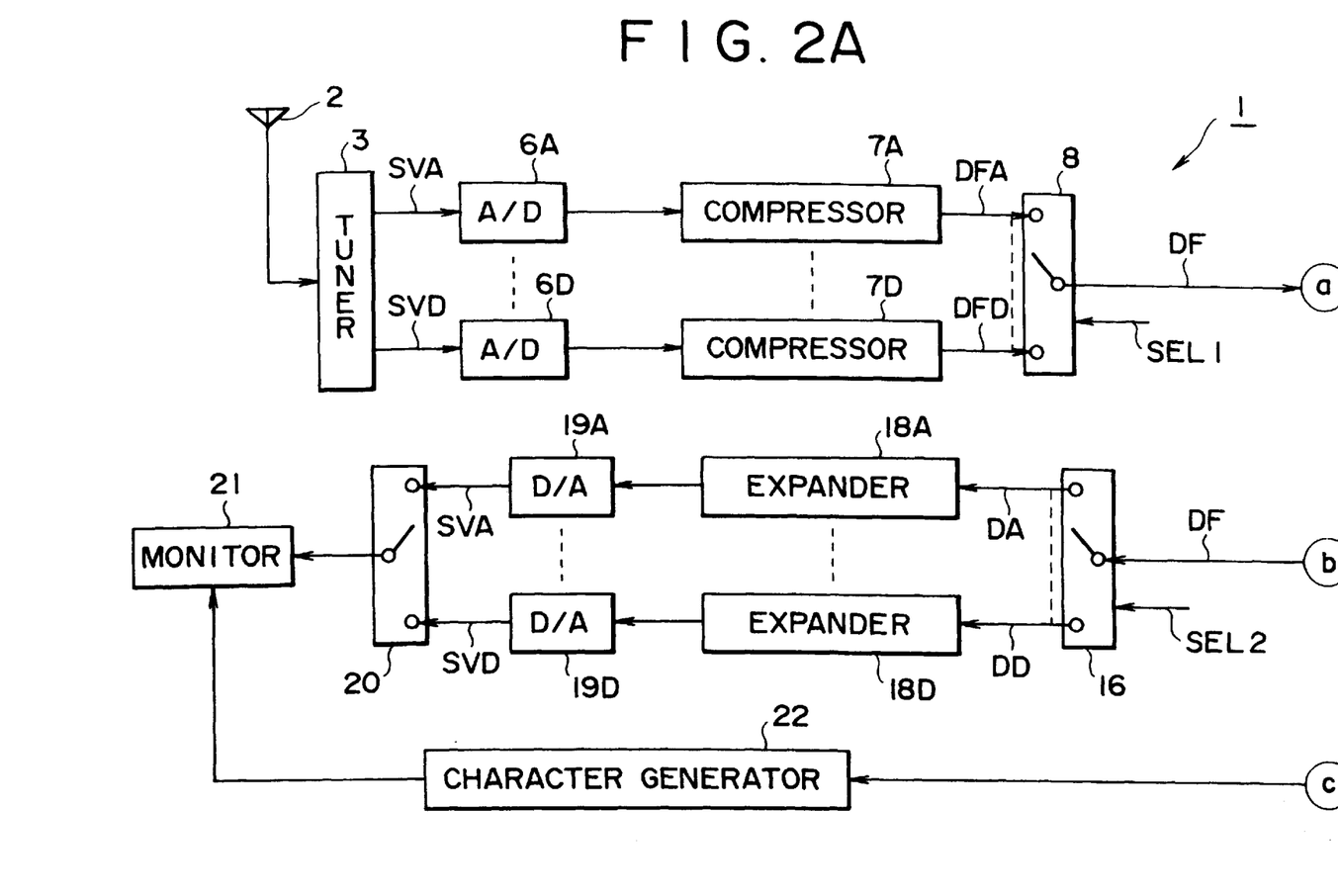

FIGS. 2, 2A and 2B is a block diagram illustrating an optical disk apparatus pertaining to a first preferred embodiment of the invention. This optical disk apparatus 1 inputs television broadcast signals received by an antenna 2 into a tuner 3. The tuner 3 here, consisting of four lines of channel selecting circuits and demodulators whose actions are switched under the control of a system control circuit 4, selects television broadcast signals on a plurality of channels preferred by a user, and supplies video signals and audio signals SVA to SVD.

Analog-to-digital (A/D) converters 6A to 6D subject video signals SVA to SVD, respectively, to A/D conversion, and supply digital video signals and digital audio signals.

Compressors 7A to 7D compress by the Moving Picture Experts Group (MPEG) encoding formula the digital video signals and the digital audio signals entered from the A/D converters 6A to 6D, respectively, and supply the compressed signals. In doing so, the compressors 7A to 7D switch, under the control of the system control circuit 4, their respective actions according to the recording mode, and supply encoded data DFA to DFD at data compression ratios matching the respective recording modes.

Thus, the compressors 7A to 7D, while they supply the encoded data DFA to DFD at 4 Mbps in a standard mode, supply the encoded data DFA to DFD at 2 Mbps and 1 Mbps in first and second long-play recording modes, respectively.

Figure 3A:
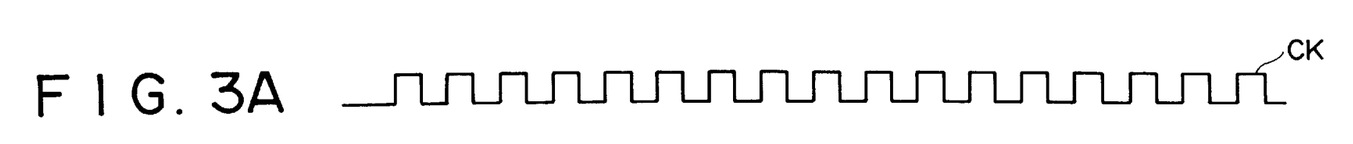
FIGS. 3A to 3F are time charts for helping describe multiplexing by the optical disk apparatus of FIG. 2.
Figure 3B:
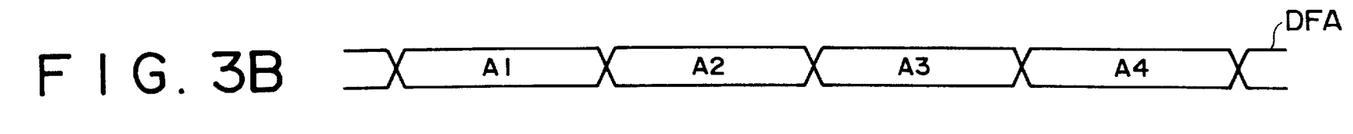
Figure 3C:
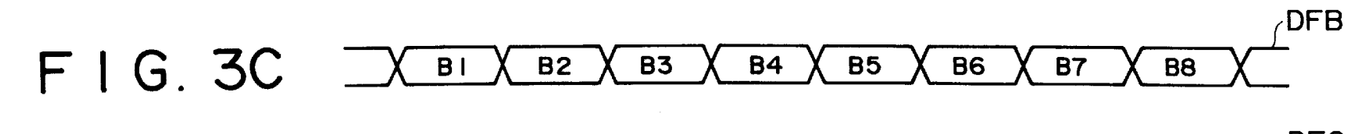
Figure 3D:
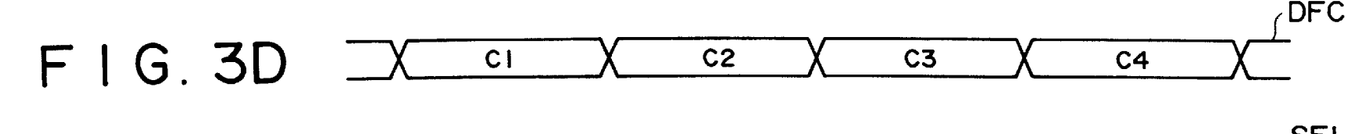
Figures 3E, 3F:
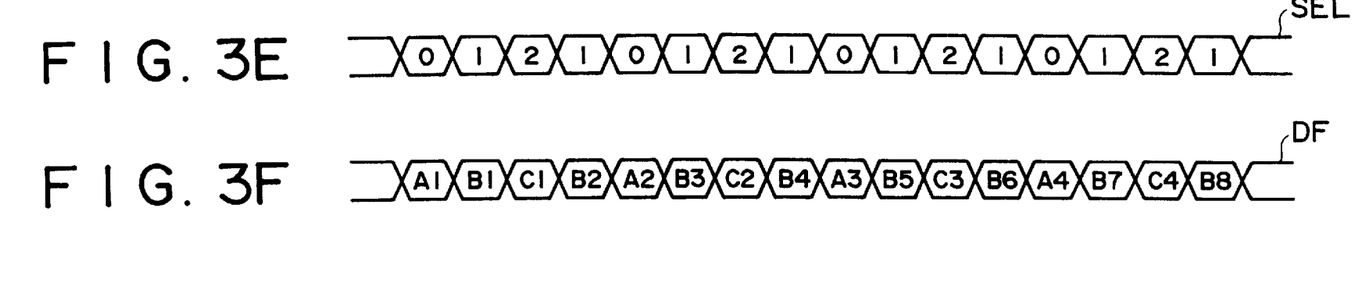
Figures 4A, 4B, 4C:
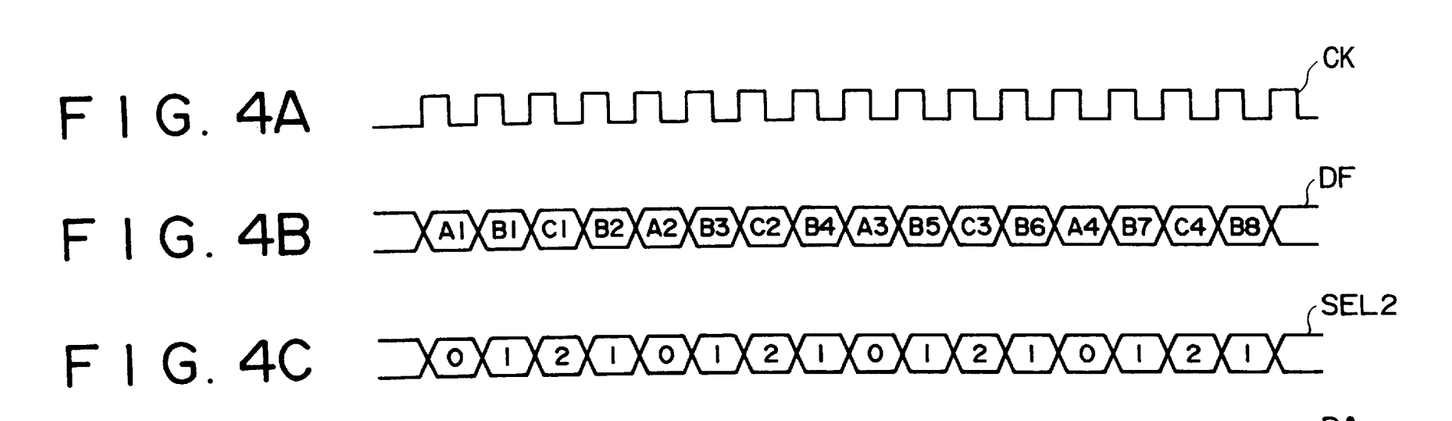
FIGS. 4A to 4F are time charts for helping describe the demultiplexing of the multiplexed data.
Figure 4D:
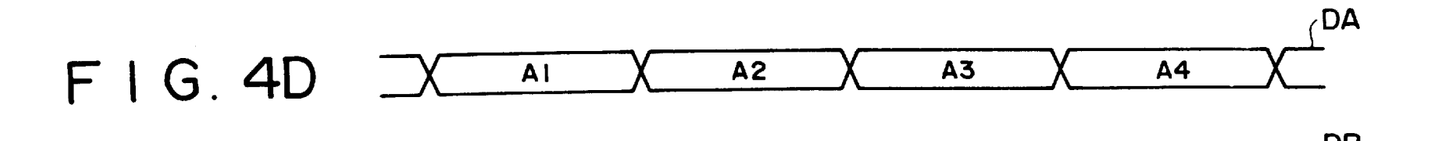
Figure 4E:
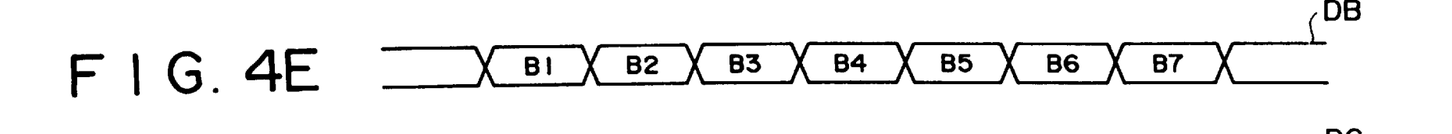
Figure 4F:
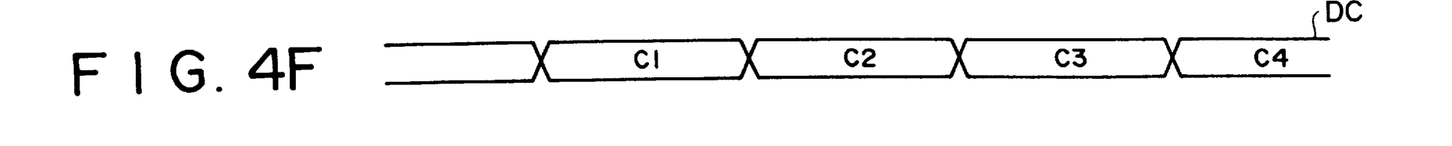

A multiplexer 8 switches a contact in response to a switching signal SEL1 supplied from a timing generator (not shown), and selectively supplies the encoded data DFA to DFD supplied by the compressors 7A to 7D. The switching signal SELL here, as shown in FIG. 3E, is generated under the control of the system control circuit 4 with reference to a clock CK (FIG. 3A) synchronized with the encoded data DFA to DFD in the standard mode.

In response to this switching signal SEL1, the multiplexer 8 selectively supplies corresponding encoded data when one program is to be recorded in the standard mode and another, in the first or second long-play mode. Or when a plurality of programs are to be recorded in the first or second long-play mode, it switches the contact in a prescribed sequence in synchronism with the clock CK, accordingly multiplexes the encoded data DFA to DFD (FIGS. 3B to 3D) corresponding to the plurality of programs on a bit-by-bit basis, and supplies mutiplexed data DF (FIG. 3F).

An ECC encoder 9, after adding such supplementary data as error correction codes and headers to the output data DF of the multiplexer 8, encodes the whole data by an encoding formula suitable for recording on an optical disk and supplies the encoded data. A modulator 10 generates a modulating signal on the basis of the output data of this ECC encoder 9, and drives an optical pickup 11 with this modulating signal. The modulator 10 also generates and supplies a modulating signal according to management data supplied from the system control circuit 4 when an optical disk 12 is unloaded or the power supply to the optical disk apparatus 1 is turned off.

The optical pickup 11 irradiates the information recording side of the optical disk 12 with a laser beam L and, when recording is to be done, intermittently raises the luminous energy of this laser beam L according to the modulating signal supplied by the modulator 10. When the optical disk 12 is unloaded or when the power supply to the optical disk apparatus 1 is turned off, the optical pickup 11, after shifting to a management area formed on the innermost circle of the optical disk, intermittently raises the luminous energy of this laser beam L according to the modulating signal supplied by the modulator 10.

Thus the optical disk 12 is a phase change type optical disk permitting recording and playback, designed to record information either coaxially or spirally. This information recording side of this optical disk 12 is coaxially divided, and its inner area is allocated for management use, while the outer area is for use by the apparatus user. On the optical disk 12, video signals and audio signals are recorded in this user area, and data for the management of the user area is recorded in the management area. By accessing this management area, address information on the video and audio signals recorded in the user area, the recording mode, information on the switching by the multiplexer 8 and the available area for recording in the user area, among other things, can be detected.

On its part, the optical pickup 11 updates management data in this management area under the control of the system control circuit 4 when the optical disk 12 is unloaded or when the power supply to the optical disk apparatus 1 is turned off.

On the other hand, when the optical disk 12 is loaded or the power supply to the optical disk apparatus 1 is turned on, the optical pickup 11, under the control of the system control circuit 4, shifts to the innermost circle of the optical disk 12, and irradiates the management area with the laser beam L. Further, the optical pickup 11, receiving the return beam of this laser beam L, and detects regenerated signals RF, whose level varies with a variation in the luminous energy of the return beam. In the usual playback mode, the optical pickup 11 irradiates the user area of the optical disk 12 with the laser beam L under the control of the system control circuit 4, and supplies the regenerated signals RF obtained as a result of the irradiation.

A demodulator 14 generates binary data by binary-coding and sequentially latching the regenerated signals RF, converts the binary-coded data into regenerated data D2 of prescribed bits in parallel, and supplies the converted data. An ECC decoder 15, after decoding these regenerated data D2, subjects the decoded data to error correction. The ECC decoder 15 further converts the regenerated data into serial data, with which the output data DF of the multiplexer 8 are regenerated and supplied.

As illustrated in FIG. 4, a demultiplexer 16 switches a contact in response to a prescribed switching signal SEL2 (FIG. 4C) having the clock CK (FIG. 4A) as reference, and selectively supplies the output data DF of the ECC decoder 15. This switching signal SEL2 here is generated by a timing generator (not shown) under the control of the system control circuit 4 referring to the management data so as to match the contact switching by the multiplexer 8. The demultiplexer 16 thereby regenerates decoded data DA to DD, which respectively match encoded data DFA to DFD entered into the multiplexer 8 (FIGS. 4B and 4D to 4F).

Expanders 18A to 18D subject decoded data DA to DD supplied by the demultiplexer 16, under the control of the system control circuit 4 referring to the management data, to data expansion, and supply the expanded data. The expanders 18A to 18D thereby regenerate the digital video signals and the digital audio signals entered into the compressors 7A to 7D, respectively.

Digital-to-analog (D/A) converters 19A to 19D subject the digital video signals and the digital audio signals supplied by the expanders 18A to 18D to D/A conversion, and supply the converted signals. A selector 20 selectively supplies a monitor 21 with video signals and audio signals SVA to SVD supplied by the D/A converters 19A to 19D in response to the user's operation. The optical disk apparatus 1 is thereby enabled to make available for listening/viewing by the user any desired one of the plurality of programs simultaneously recorded on the optical disk 12.

A character generator 22, under the control of the system control circuit 4, generates character frames, and superimposes them over display frames on a monitor 21. The optical disk apparatus 1 is thereby enabled to check, via the display frames on the monitor 21, information such as program information and timed reservation recorded on the optical disk 12.

A management data memory 23 holds data for the management of the optical disk 12, updates the held data under the control of the system control circuit 4, and supplies the management data it holds to the system control circuit 4 when the optical disk 12 is unloaded or the power supply to the optical disk apparatus 1 is turned off.

The system control circuit 4, consisting of a computer to control the overall operation of this optical disk apparatus 1, shifts the optical pickup 11 to the management area of the optical disk 12 when the optical disk 12 is loaded or, in a state where the optical disk 12 is kept loaded, the power supply to the optical disk apparatus 1 is turned on. Further the system control circuit 4 sequentially enters the output data D2 from the demodulator 14, and thereby acquires the management data recorded on the optical disk 12.

The system control circuit 4 records the acquired management data into the management data memory 23 and, when the user commands playback of the optical disk 12, controls access by the optical pickup 11 in accordance with the management data stored in this management data memory 23. Further the system control circuit 4 updates the contents of the management data memory 23 in response to operation by the user, and updates the management data on the optical disk 12 with the management data stored in the management data memory 23 when the optical disk 12 is unloaded or the power supply to the optical disk apparatus 1 is turned off.

Figure 1:
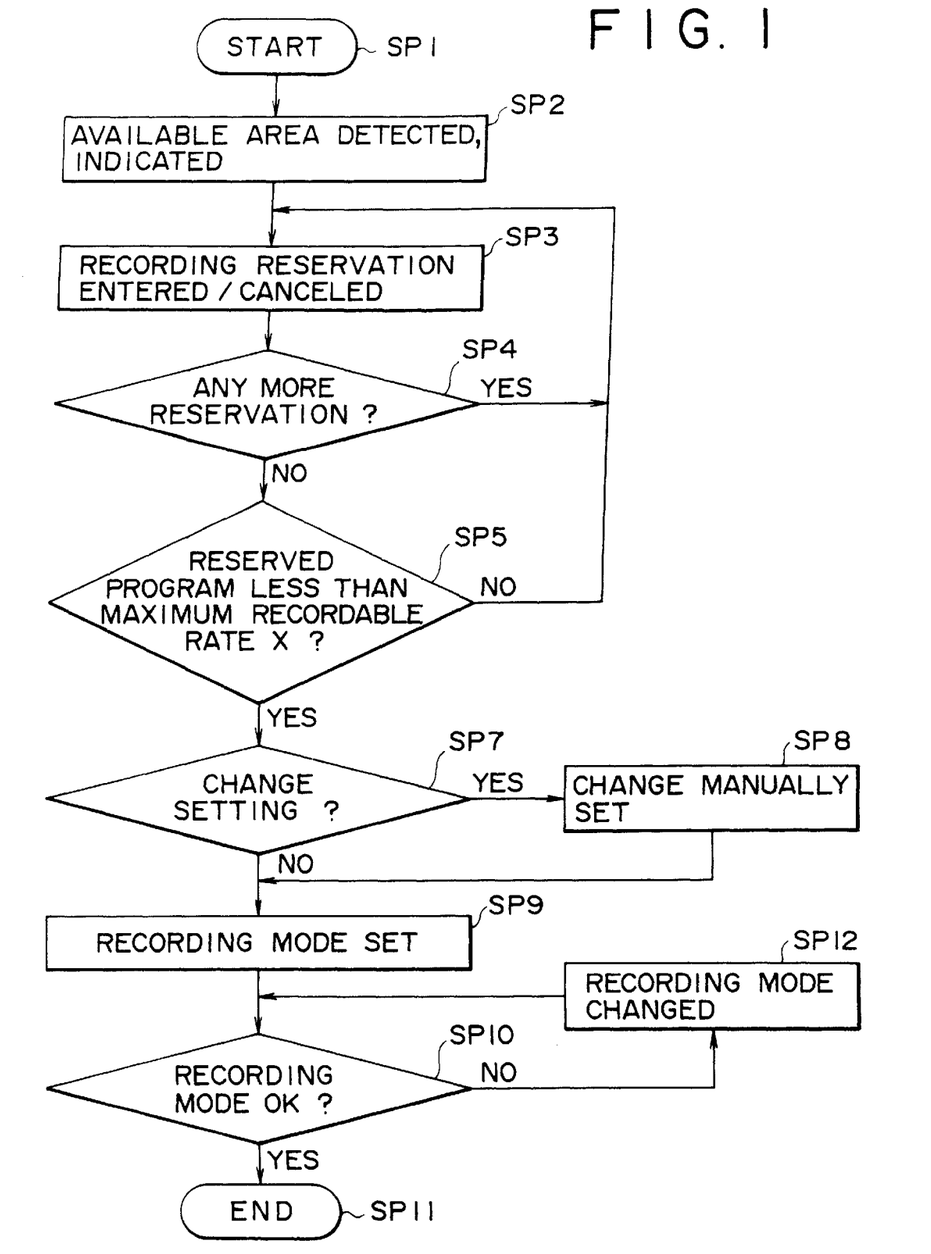
FIG. 1 is a flow chart for helping describe the operation of the system control circuit in the optical disk apparatus pertaining to a preferred embodiment of the present invention.

In this series of processings responsive to the user's operation, if the user commands timed recording, the system control circuit 4 executes the processing procedure shown in FIG. 1.

Thus, the system control circuit 4, when the user commands or cancels timed recording by operating a remote control device or the like, moves on from step SP1 to step SP2, and accesses the contents of the management data memory 23 to detect an unoccupied area on the optical disk 12. If recording and erasing are repeated on this kind of optical disk, areas available for recording are formed in a scattered manner. Therefore, the system control circuit 4 successively traces these scattered unoccupied areas according to the management data, and detects the total unused recording capacity.

Then the system control circuit 4, after displaying this unused recording capacity on the monitor 21, moves on to step SP3, where this timed recording command or cancellation is entered, and then to step SP4.

Here, the system control circuit 4, by driving the character generator 22 to display a message on the monitor 21, asks the user whether to complete the operation or not. If the user commands additional timed recording or cancels already reserved recording, the system control circuit 4 returns to step SP3 and accepts the next input.

In response to this input, the system control circuit 4 enters timed recording information on the program desired by the user, including starting and ending times, broadcast channel and recording mode and, if the user commands recording of a plurality of programs, enters timed recording information on each of the plurality of programs.

When the user's command or cancellation of timed recording is completed, the system control circuit 4 moves on from step SP4 to step SP5 and, in recording the user-designated program or programs, judges whether or not the maximum recordable rate X of this optical disk apparatus 1 is surpassed.

This optical disk apparatus 1, if the user designates a recording mode and a program is to be recorded in this user-designated mode, judges whether or not the output data of the multiplexer 8 to be recorded on the optical disk 12 will surpass the maximum data transfer rate X at which recording is possible. Or if the user reserves timed recording without designating a recording mode, it is judged, if the user-designated program is recorded in the second long-play mode, whether or not the output data of the multiplexer 8 to be recorded on the optical disk 12 will surpass the maximum data transfer rate X at which recording is possible. Here in this preferred embodiment, the rotational speed of the optical disk 12, the optical pickup 11, the modulator 10 and any other relevant constituent are configured so that a maximum data transfer rate X of 4 Mbps, equivalent to the output data of the multiplexer 8, is ensured.

Figure 5:
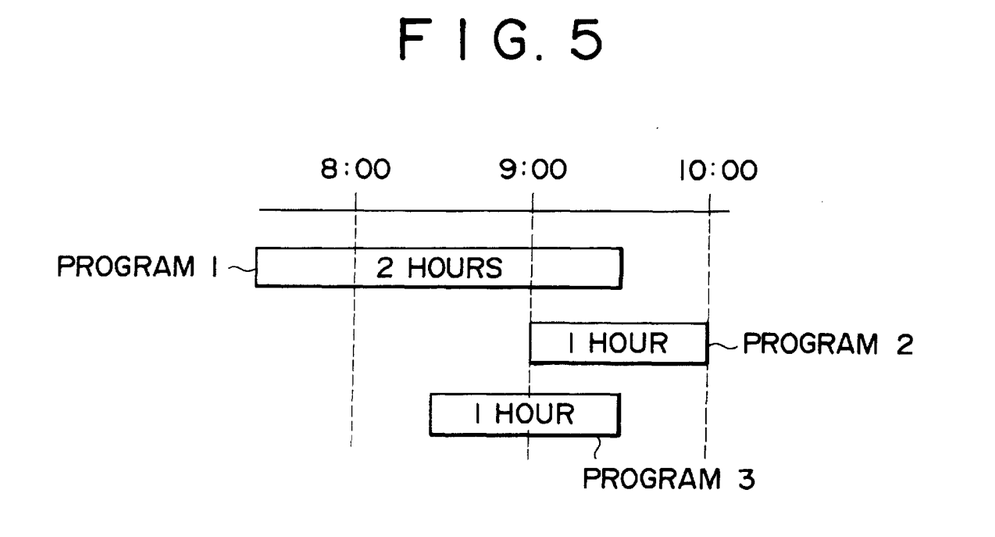
FIG. 5 is a time chart for helping describe the procedure of timed reservation.

Thus, as illustrated in FIG. 5, if for example a two-hour program 1 from 7:30, a one-hour program 2 from 9:00 and another one-hour program 3 from 8:30 are reserved for timed recording, the system control circuit 4 judges whether or not these three programs can be recorded with reference to the speed of data transfers to the optical disk 12.

In this case, as the volume of data to be recorded on the optical disk 12 reaches the maximum transfer rate in the time range from 9:00 to 9:30 when the three programs are to be recorded simultaneously, if the user does not designate a recording mode, 1 Mbps of encoded data in the second long-play mode will be multiplexed with 3 Mbps of output data by the multiplexer 8, and the system control circuit 4 will judge that the maximum data transfer rate X (4 Mbps) will not be surpassed and move on to step SP7.

Or if, for instance, the user commands every program to be recorded in the first long-play mode, 2 Mbps of encoded data will be multiplexed with 6 Mbps of output data by the multiplexer 8 in the time range from 9:00 to 9:30, and the system control circuit 4 will judge that the maximum data transfer rate X (4 Mbps) will be surpassed and return to step SP3. Therefore the system control circuit 4 displays a message notifying the user of the impossibility to record the programs as commanded, and waits for a modification or cancellation of the reservation by the user.

Having accepted a reservation or the like in this manner, the system control circuit 4 judges, at step SP7, whether or not the user has selected a setting alteration menu for the recording mode. If the answer is affirmative, the system control circuit 4 moves on to step SP8, and accepts a recording mode setting change for each program by the user's manual operation. At this step SP8, if the user selects an ending menu, the system control circuit 4 moves on to step SP9. Or if, at step SP7, the user selects a menu for no change, the system control circuit 4 moves on directly to step SP9.

At this step SP9, the system control circuit 4 calculates and displays the available recording mode with reference to the unused recording capacity detected at step SP2 and the maximum data transfer rate X. Thus, if a two-hour program and a one-hour program are to be recorded at the 2 Mbps data transfer rate of the first long-play mode, the two programs will require on the optical disk 12 data volumes of 2 Mbps×2×60×60 (sec)/8=1.8 (GB) and 2 Mbps×60×60 (sec)/8=0.9 (GB), respectively, in equivalents to the output data DF of the multiplexer 8. Or if they are to be recorded at the 1 Mbps data transfer rate of the second long-play mode, the two programs will require on the optical disk 12 data volumes of 1 Mbps×2×60×60 (sec)/8=0.9 (GB) and 1 Mbps×60×60 (sec)/8=0.45 (GB), respectively, in equivalents to the output data DF of the multiplexer 8.

Figure 6:
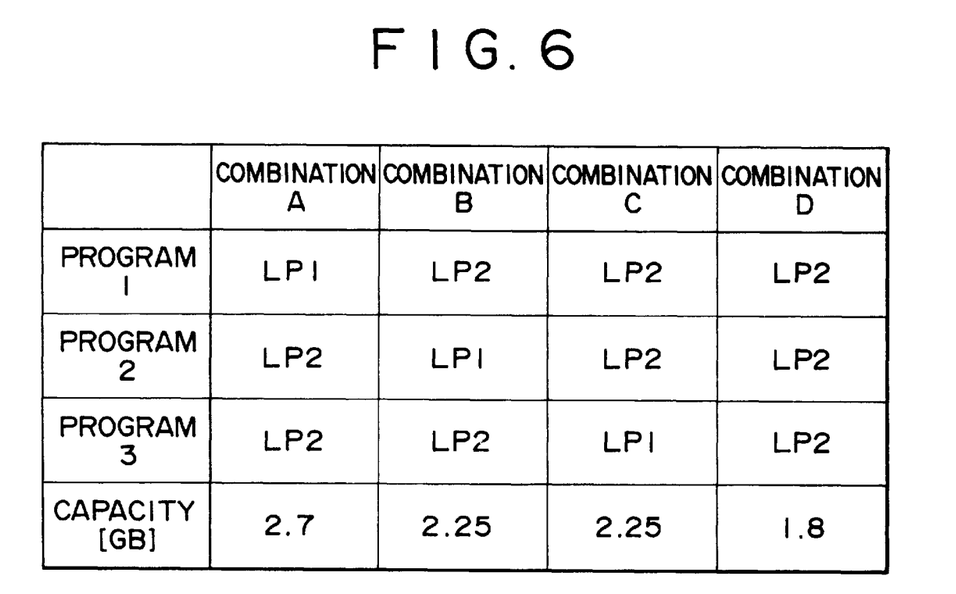
FIG. 6 is a chart for helping describe a combination of recording modes.

This disposition makes possible, where program recording is to be reserved as described with reference to FIG. 5, prevention of surpassing the maximum data transfer rate X by combining recording modes as shown in FIG. 6, and these combinations require capacities of 2.7 (GB), 2.25 (GB), 2.25 (GB) and 1.8 (GB), respectively. Incidentally, in this FIG. 6, the first and second long-play modes are denoted by codes LP1 and LP2, respectively.

This arrangement causes the system control circuit 4, if for example the unused recording capacity detected on the optical disk 12 is 2 GB, to select and display on the monitor 21 this fourth combination. If there are a plurality of combinations recordable on the optical disk 12, the system control circuit 4 displays the plurality of combinations.

Further the system control circuit 4, if the user designates a recording mode for any program, displays recordable combinations for other programs with the program to be recorded in this designated mode. Thus, referring to the combinations shown in FIG. 6, if the optical disk 12 has an unused recording capacity of no less than 2.25 GB and the user reserves timed recording of program 3 in the second long-play mode, the system control circuit 4 displays the second and fourth combinations B and D.

In displaying a plurality of combinations as referred to above, the system control circuit 4 sets one combination as first candidate among the recordable combinations.

Having displayed a candidate recording mode in this manner, the system control circuit moves on to step SP10 to urge the user to confirm the recording mode. If then the user selects the menu for confirmation, the system control circuit 4, after storing timed reservation information based on the first candidate into prescribed storage means, moves on to step SP11 to complete this processing procedure.

Or if the user selects the menu for alteration at step SP10, the system control circuit 4 moves on to step SP12 and, after setting the following combination as first candidate, returns to step SP10. Then the system control circuit 4, after presenting an available recording mode to the user with reference to the transfer rate at which recording is possible and the unused capacity of the optical recording apparatus, is caused to set the recording mode according to the user's judgment and, when the recording start time comes, begins processing for timed recording in this mode.

Figure 7:
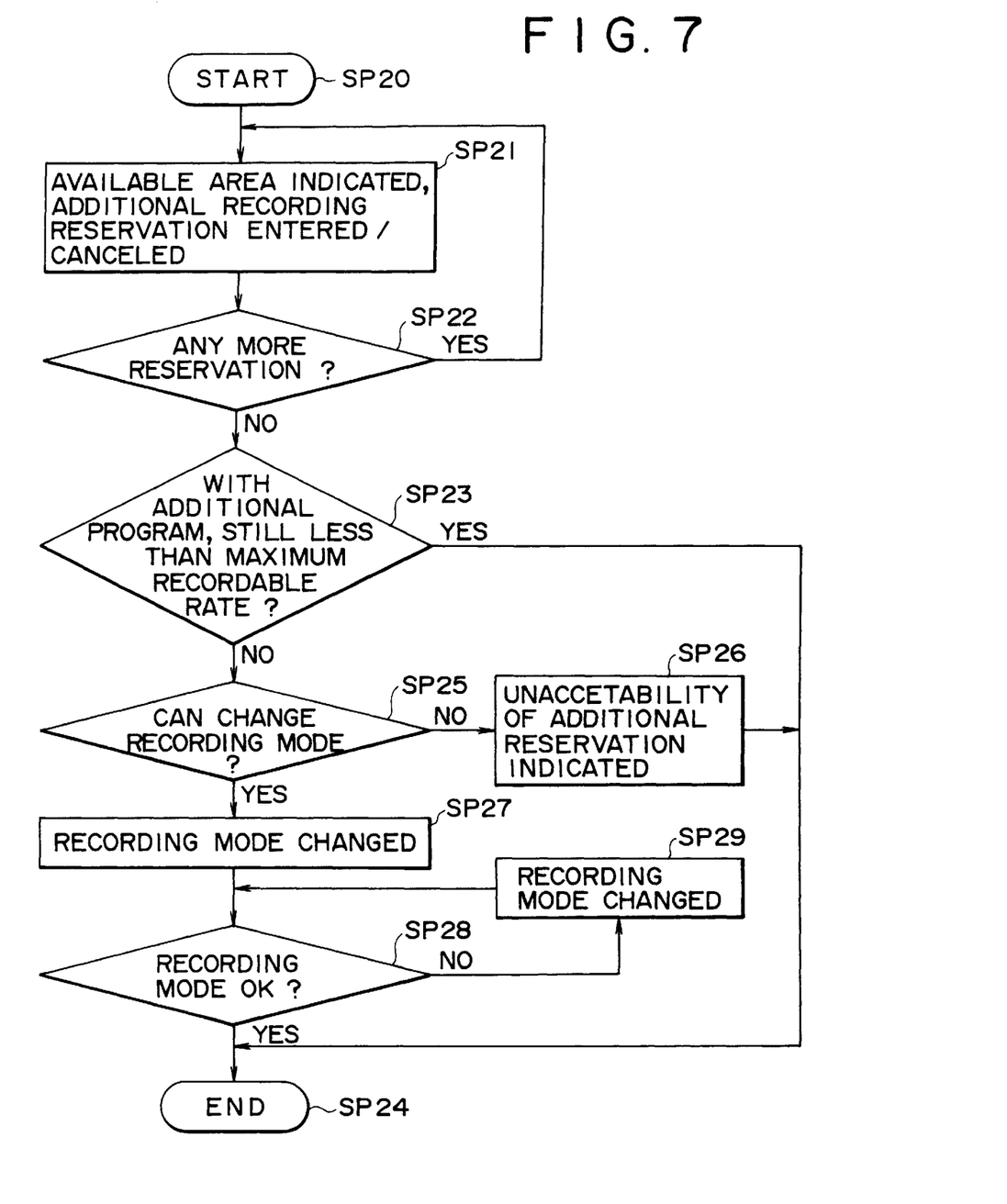
FIG. 7 is a flow chart for helping describe the operation of the system control circuit in an additional reservation procedure.

FIG. 7 is a flow chart showing the processing procedure taken when the user, in a state in which timed recording is reserved or started, adds a timed reservation anew.

In this case, the system control circuit 4, moving on from step SP20 to SP21, displays the capacity of unoccupied areas on the optical disk 12 and, after entering a command or cancellation of timed recording, goes further on to step SP22.

Here, the system control circuit 4, by driving the character generator 22 to display a message on the monitor 21, asks the user whether to complete the operation or not. If the user commands additional timed recording or cancels already reserved recording, the system control circuit 4 returns to step SP21 and accepts the next input. The system control circuit 4 thereby enters timed reservation information regarding the program the user desires to record additionally.

Then the system control circuit 4 moves on to step SP23, and judges whether or not the speed of data transfer to the optical disk 12 is within the maximum recordable rate X even with this additional program. If the additional reservation is set in a time range different from the already reserved program or programs, or if the user designates the second long-play mode and reserves timed recording in that mode on or after, for example, 9:30 as referred to in FIG. 5, an affirmative answer will be obtained at step SP23, and in this case the system control circuit 4, after registering this additional program reservation in the memory, moves on to step SP24 to complete this processing procedure.

Or if in a state where, for instance, the three programs mentioned above with reference to FIG. 5 are reserved for timed recording in the first long-play, second long-play and second long-play modes, respectively, timed reservation of an addition program from 8:30 till 9:30 in the first recording mode is entered, the total data transfer speed will be 6 Mbps between 8:30 and 9:30, with the result that the system control circuit 4 receives a negative result at step SP 23 and moves on to step S25.

Here the system control circuit 4 judges, with respect to these programs reserved for timed recording, whether or not the recording mode can be changed and, if a negative result is obtained, moves on to step SP26, where it displays on the monitor 21 the impossibility to accept the additional reservation. Then it moves on to step SP24 to complete this processing procedure.

Or if, for instance, any of the programs is reserved for timed recording in the first long-play mode, as this program can be altered to the second long-play mode, the system control circuit 4 receives an affirmative answer at SP25, and moves on to step SP27. Here the system control circuit 4, with respect to this additional program and the programs already reserved for timed recording, calculates anew the available recording mode in the same manner as described with regard to step SP29 with reference to the maximum recordable rate X for the optical disk 12 and the unused capacity of the optical disk 12, and displays the result of calculation.

Then the system control circuit 4 goes on to step SP28 to urge the user to confirm the recording mode, and if the user selects the menu for confirmation, moves on to step SP24 to complete this processing procedure. Or if the user selects the menu for alteration at step SP28, the system control circuit 4 moves on to step SP29 and, after setting the following combination as first candidate, returns to step SP28. The system control circuit 4, after presenting an available recording mode to the user with reference to the transfer rate at which recording is possible and the unused capacity of the optical recording apparatus, is thereby caused, when a timed reservation is added as well, to set the recording mode according to the user's judgment and, when the recording start time comes, begins processing for timed recording in this mode.

In the above-described configuration, when the optical disk 12 is loaded into the optical disk apparatus 1 (FIG. 2), the optical pickup 11 shifts to the innermost circle of the optical disk 12, and regenerates the management area formed on this innermost circle. The management data recorded in this management area is thereby developed in the management data memory 23, and as the user operates a remote control device or the like to play back a desired program, for instance, the optical disk 12 is played back in accordance with address information on video signals and audio signals, recording mode and switching information for the multiplexer 8, all stored in this management data memory 23.

Thus regenerated signals supplied from the optical pickup 11, after being converted by the demodulator 14 into regenerated data D2, go through decoding and error correction by the ECC decoder 15 to generate decoded data DF, which are separated by the demultiplexer 16 into decoded data DA to DD on different channels. These decoded data DA to DD are expanded by the expanders 18A to 18D, respectively, to be converted into digital video signals and digital audio signals, and further converted by the D/A converters 19A to 19D, respectively, into analog video signals and analog audio signals. Then these video signals and audio signals are selected by the selector 20 and supplied to the monitor 21, so that the program desired by the user be presented via the monitor 21.

Or if the user commands recording, the tuner 3 in the optical disk apparatus 1 selects the pertinent broadcast channel. If the user selects a plurality of channels, video signals and audio signals on each selected channel are entered into the A/D converters 6A to 6D, where digital video signals and digital audio signals are generated.

These digital video signals and digital audio signals on the different channels, after being compressed by the compressors 7A to 7D at data compression ratios controlled by the system control circuit 4, are subjected to time-division multiplexing by the multiplexer 8. The ECC encoder 9 encodes the output data of this multiplexer 8 after they are supplemented with data including error correction codes and headers. The output data of this ECC encoder 9 are converted by the modulator 10 into a modulating signal, which serves to intermittently raise the lunimous energy of the laser beam emitted from the optical pickup 11.

At this time, the optical pickup 11 is controlled by the system control circuit 4 so as to access unoccupied areas on the optical disk on the basis of the management data stored in the management data memory 23, and broadcast programs on a plurality of channels are thereby simultaneously recorded successively into the unoccupied areas on the optical disk 12. Further, the contents of the management data memory 23 are updated with these records, and the management area on the optical disk 12 is updated with the updated management data when the optical disk 12 is unloaded or when the power supply to the optical disk apparatus is turned off.

At the time of subsequent playback, the actions of the multiplexer 16 and other constituents are controlled in accordance with the management data, so that any of the simultaneously recorded programs on the plurality of channels can be played back to enable the user to watch the desired program.

When the user reserves such timed recording of a plurality of programs, in the optical disk apparatus 1 (FIG. 1), the system control circuit 4 acquires timed reservation information consisting of the starting and ending times of recording and the broadcast channel with respect to each of the programs entered by the user. If the user designates a recording mode, information on this recording mode is also acquired by the system control circuit 4 as one of the items of timed reservation information.

When the plurality of programs entered by the user are to be recorded on the basis of the timed reservation information so acquired, the system control circuit 4 judges where or not recording on the optical disk 12 is impossible beyond the maximum data transfer rate X at which recording on the optical disk 12 is possible. If recording is possible here, the available capacity of the optical disk 12 is detected on the basis of the management data stored in the management data memory 23, and the recording modes that can be set are detected with reference to the maximum data transfer rate X and the capacity available for recording use.

If the user agrees to timed recording in the combination of these detected recording modes, the system control circuit 4 sets timed reservations in these recording modes or, if the user does not, the next candidate combination is presented to the user, and timed reservations are set in the recording modes selected by the user.

The optical disk apparatus 1 is thereby caused to start processing of timed reservations in the recording modes set with reference to the maximum data transfer rate X and the available recording capacity. Thus the broadcast channels on which the user has reserved timed recording are selected by the tuner 3, and the digital video signals and the digital audio signals obtained as a result are subjected to data compression by the compressors 7A to 7D at the data compression ratios corresponding to the respective recording modes. Further, by switching contacts to match the recording modes, the multiplexer 8 multiplexes the encoded data DFA to DFD for the plurality of channels.

In this process, the optical disk apparatus 1, by making the data compression ratio changeable for each channel and multiplexing digital video signals and digital audio signals on a plurality of channels, can switch the data compression ratio individually as required even if a plurality of programs are to be recorded simultaneously, and thereby simply and reliably record the plurality of programs.

Further by setting recording modes with reference to the maximum data transfer rate X and the available recording capacity, the optical disk apparatus 1 can simply and reliably execute this switching and is improved in handling convenience correspondingly.

If, in a state where timed reservations have already been made, or even in a state where recording has started according to the timed reservations, an additional timed reservation is to be entered (FIG. 7), the optical disk apparatus 1 judges, in the same manner as initial timed reservations, whether or not the additional program can be recorded on the optical disk 12 beyond the maximum data transfer rate X at which recording on the optical disk 12 is possible. If the additional recording is found possible, the available recording capacity on the optical disk 12 is detected on the basis of the management data stored in the management data memory 23, and the recording mode that can be set is detected with reference to the maximum data transfer rate X and the available recording capacity.

If the user agrees to timed recording in the combination of these detected recording modes, the system control circuit 4 sets timed reservations in these recording modes or, if the user does not, the next candidate combination is presented to the user, and timed reservations are set in the recording modes selected by the user.

If, in a state where any timed reservation has been made in this manner, an additional timed reservation is to be made or if, even in a state where recording has started according to the timed reservation, an additional timed reservation is to be made, this configuration, by making the data compression ratio changeable for digital video signals and digital audio signals on a plurality of channels and multiplexing these digital video signals and digital audio signals on the optical disk 12, makes possible simultaneous recording of the plurality of programs simply and reliably by switching these data compression ratios as required.

Furthermore, when making any timed reservation or an additional timed reservation, or altering any timed reservation, the desired plurality of programs can be recorded simultaneously and reliably in a simple process by setting recording modes with reference to the maximum data transfer rate X and the available recording capacity, and controlling the switching of data compression ratios in accordance with these recording modes. Thus any state in which a program cannot be recorded on account of a shortage in available capacity on the optical disk 12 can be prevented, and at the same time the action to select the recording mode can be simplified. Furthermore, as required, any additional timed reservation can be set as desired, and this addition can be executed even while recording is taking place.

Although the foregoing embodiment of the invention was described with reference to an instance in which, in making a timed reservation, the recording mode is set with reference to the maximum data transfer rate X and the available recording capacity, the invention is not limited to this disposition, but similar processing may as well be executed to set data compression ratios when the user starts recording by his or her direct action. This disposition would make the optical disk apparatus even more convenient to use.

Furthermore, while the foregoing embodiment was described with reference to a case in which, if the unused capacity of the optical disk is insufficient for further recording, the user is notified of this shortage of available area, the invention is not limited to this disposition, but it is also conceivable to erase, after a menu of erasable programs on the optical disk 12 is displayed, recorded programs on the optical disk 12 as preferred by the user, and thereby secure an unused area.

In addition, though the foregoing embodiment was described with reference to a case in which a plurality of programs are multiplexed on a bit-by-bit basis and recorded, the invention is not limited to this disposition, but a wide variety of multiplexing units can also be applied including the byte, or various blocks such as the simple block, the macro block or the GOP by the MPEG formula.

Also, though the foregoing embodiment was described with reference to an instance in which data compression ratios are switched stepwise, the invention is not limited to this disposition, but the ratios may as well be switched continuously.

Figure 8:
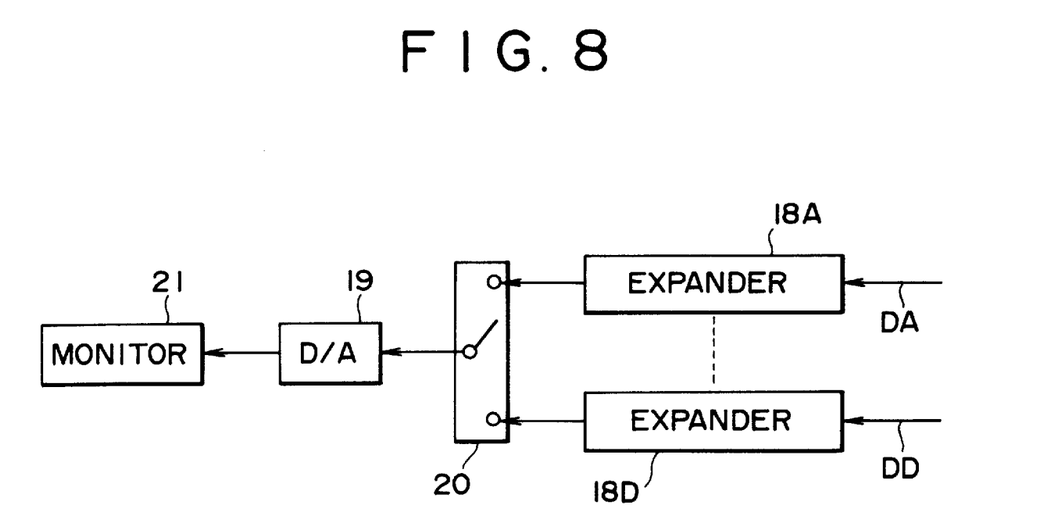
FIG. 8 is a block diagram illustrating part of an optical disk apparatus pertaining to another preferred embodiment of the invention, wherein the number of digital-to-analog converters in the optical disk apparatus of FIG. 2 is reduced.

Although the foregoing embodiment was described with reference to a case in which expanded digital video signals and digital audio signals are individually subjected to D/A conversion, the invention is not limited to this disposition, but it is also conceivable to arrange a D/A converter downstream of the selector 20 as illustrated in FIG. 8, and apply D/A conversion only to a single program selected by the user. Then the number of D/A converters can be reduced correspondingly, and the overall configuration simplified accordingly.

Further, while the foregoing embodiment was described with reference to a case in which data are compressed by the MPEG formula, the invention is not limited to this disposition, but can be extensively applied to other instances where data are compressed by various other techniques.

Also, although the foregoing embodiment was described with reference to an instance in which television broadcast programs are multiplexed and recorded, the invention is not limited to this disposition, but can also be extensively applied to the multiplexed recording of FM radio programs and various other programs whether transmitted by cable or by wireless.

Further yet, while the foregoing embodiment was described with reference to a case in which a plurality of programs are selected with a built-in tuner, the invention is not limited to this disposition, but can be extensively applied to instances in which a plurality of programs are selected with an external television tuner, programs are selected with an external television tuner and FM tuner, or any input signals are multiplexed and recorded with respect to a plurality of programs.

Also, though the foregoing embodiment was described with reference to an instance in which desired programs are recorded on a phase change type optical disk, the invention is not limited to this disposition, but can be extensively applied to the recording of a plurality of programs on a photomagnetic disk or a write-once type optical disk, on a magnetic tape or disk, or on various other recording media.

As hitherto described, the present invention makes possible simultaneous recording of a desired plurality of programs in a simple and reliable manner by controlling the switching of data compression ratios, when input signals for a plurality of programs, after being subjected to data compression, are to be multiplexed and recorded, for each input signal and switching the data compression ratios according to the transfer rate at which recording is possible and the unused capacity of the recording medium among other factors.

What is claimed is:

1. A program recording apparatus for simultaneous recording of a plurality of programs in response to user selection, comprising:
   data compressing means for receiving input signals for each of said programs and for compressing each of said input signals at a respective compression ratio;
   multiplexing means for multiplexing output data of said data compressing means, the multiplexing means having a transfer data rate;
   data recording means for recording the output data from said multiplexing means on a recording medium; and
   control means for controlling switching of the respective data compression ratios, wherein the respective compression ratios available for user selection are based upon the data transfer rate, a respective time length of each of the plurality of programs and a capacity available for recording on the recording medium;
       wherein said control means judges whether or not said plurality of programs can be recorded with reference to the data transfer rate at which recording is possible by said data recording means and supplies the judgment to said user.

2. The program recording apparatus as claimed in claim 1, wherein said control means controls the switching of said data compression ratios on the basis of the judgment.

3. The program recording apparatus as claimed in claim 3, wherein said control means is responsive to an operation of said user for controlling the switching of said data compression ratios.

4. The program recording apparatus as claimed in claim 1, further comprising:
   unused capacity detecting means for detecting said capacity available for recording on said recording medium, wherein said control means judges whether or not said plurality of programs can be recorded with reference to said capacity available for recording, and supplies the judgment to said user.

5. The program recording apparatus as claimed in claim 1, further comprising:
   unused capacity detecting means for detecting the capacity available for recording on said recording medium, wherein said control means judges whether or not said plurality of programs can be recorded with reference to said capacity available for recording, and controls the switching of said data compression ratios on the basis of the judgment.

6. The program recording apparatus as claimed in claim 5, wherein said control means is responsive to an operation of said user in controlling the switching of said data compression ratios.

7. The program recording apparatus as claimed in claim 1, wherein said plurality of programs consist of broadcast programs reserved for timed recording.

8. The program recording apparatus as claimed in claim 1, wherein said plurality of programs consist of broadcast programs reserved for timed recording and broadcast programs additionally reserved for timed recording.

9. The program recording apparatus as claimed in claim 1, wherein said plurality of broadcast programs consist of programs being recorded on said recording medium and broadcast programs additionally reserved for timed recording.

10. A program recording method for simultaneous recording of a plurality of programs in response to user selection, comprising the steps of:
    receiving input signals for each of said programs;
    compressing each of said input signals at a respective compression ratio;
    multiplexing each of the compressed input signals and outputting a multiplexed signal at a transfer data rate;
    recording the multiplexed on a recording medium;
    controlling switching of the respective data compression ratios, wherein the respective compression ratios available for user selection are based upon the data transfer rate, a respective time length of each of the plurality of programs and a capacity available for recording on the recording medium;

judging whether or not said plurality of programs can be recorded with reference to the data transfer rate; and supplying the judgment to said user.

11. The program recording method apparatus as claimed in claim 10, further comprising the step of:

controlling the switching of said data compression ratios on the basis of the judgment.

12. The program recording method as claimed in claim 11, wherein said step of controlling is responsive to an operation of said user for controlling the switching of said data compression ratios.

13. The program recording method as claimed in claim 10, further comprising the steps of:

detecting said capacity available for recording on said recording medium;

judging whether or not said plurality of programs can be recorded with reference to said capacity available for recording; and supplying said judgment to said user.

14. The program recording method as claimed in claim 10, further comprising the steps of:

detecting the capacity available for recording on said recording medium;

judging whether or not said plurality of programs can be recorded with reference to said capacity available for recording; and controlling the switching of said data compression ratios on the basis of the judgment.

15. The program recording method as claimed in claim 14, wherein said step of controlling is responsive to an operation of said user in controlling the switching of said data compression ratios.

16. The program recording method as claimed in claim 10, wherein said plurality of programs consist of broadcast programs reserved for timed recording.

17. The program recording method as claimed in claim 10, wherein said plurality of programs consist of broadcast programs reserved for timed recording and broadcast programs additionally reserved for timed recording.

18. The program recording method as claimed in claim 10, wherein said plurality of broadcast programs consist of programs being recorded on said recording medium and broadcast programs additionally reserved for timed recording.

19. A program recording apparatus for simultaneous recording of a plurality of programs in response to user selection, comprising:

a compressor for receiving input signals for each of said programs and for compressing each of said input signals at a respective compression ratio;

a multiplexer for multiplexing output data of said data compressor, the multiplexer having a transfer data rate;

a data recorder for recording the output data from said multiplexer on a recording medium; and a controller for controlling switching of the respective data compression ratios, wherein the respective compression ratios available for user selection are based upon the data transfer rate, a respective time length of each of the plurality of programs and a capacity available for recording on the recording medium;

wherein said controller judges whether or not said plurality of programs can be recorded with reference to the data transfer rate at which recording is possible by said data recorder, and supplies the judgment to said user.

20. The program recording apparatus as claimed in claim 19, wherein said controller controls the switching of said data compression ratios on the basis of the judgment.

21. The program recording apparatus as claimed in claim 20, wherein said controller is responsive to an operation of said user for controlling the switching of said data compression ratios.

22. The program recording apparatus as claimed in claim 19, further comprising:

a detector for detecting said capacity available for recording on said recording medium, wherein said controller judges whether or not said plurality of programs can be recorded with reference to said capacity available for recording, and supplies the judgment to said user.

23. The program recording apparatus as claimed in claim 19, further comprising:

a detector for detecting the capacity available for recording on said recording medium, wherein said controller judges whether or not said plurality of programs can be recorded with reference to said capacity available for recording, and controls the switching of said data compression ratios on the basis of the judgment.

24. The program recording apparatus as claimed in claim 23, wherein said controller is responsive to an operation of said user in controlling the switching of said data compression ratios.

25. The program recording apparatus as claimed in claim 19, wherein said plurality of programs consist of broadcast programs reserved for timed recording.

26. The program recording apparatus as claimed in claim 19, wherein said plurality of programs consist of broadcast programs reserved for timed recording and broadcast programs additionally reserved for timed recording.

27. The program recording apparatus as claimed in claim 19, wherein said plurality of broadcast programs consist of programs being recorded on said recording medium and broadcast programs additionally reserved for timed recording.

* * * * *